(12) United States Patent
Tauchi et al.

(10) Patent No.: US 10,490,350 B2
(45) Date of Patent: *Nov. 26, 2019

(54) DIELECTRIC COMPOSITION, DIELECTRIC ELEMENT, ELECTRONIC COMPONENT AND MULTI-LAYER ELECTRONIC COMPONENT

(71) Applicant: TDK Electronics AG, München (DE)

(72) Inventors: Goushi Tauchi, Tokyo (JP); Masakazu Hirose, Tokyo (JP); Tomoya Imura, Tokyo (JP); Tomohiro Terada, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,678

(22) PCT Filed: Jun. 16, 2016

(86) PCT No.: PCT/EP2016/063884
§ 371 (c)(1),
(2) Date: Jan. 17, 2018

(87) PCT Pub. No.: WO2017/012797
PCT Pub. Date: Jan. 26, 2017

(65) Prior Publication Data
US 2018/0211777 A1 Jul. 26, 2018

(30) Foreign Application Priority Data
Jul. 17, 2015 (JP) .................................. 2015-143395

(51) Int. Cl.
*C04B 35/475* (2006.01)
*H01G 4/12* (2006.01)
(Continued)

(52) U.S. Cl.
CPC ......... *H01G 4/1218* (2013.01); *C04B 35/462* (2013.01); *C04B 35/47* (2013.01);
(Continued)

(58) Field of Classification Search
CPC ............................ C04B 35/475; H01G 4/1227
See application file for complete search history.

(56) References Cited

U.S. PATENT DOCUMENTS 8,067,325 B2  11/2011  Shimada et al.
8,076,257 B1  12/2011  Wilson
(Continued)

FOREIGN PATENT DOCUMENTS

CN  101815774 A  8/2010
CN  103482975 A  1/2014
(Continued)

OTHER PUBLICATIONS

Jaita, P. et al., "Composition Range and Electrical Properties of the Morphotropic Phase Boundary in Bi0.5 (NA0.80K0.20)0.5TiO3-(Ba0.7Sr0.3)TiO3 System," Electronic Materials Letters, vol. 9, No. 4, Jul. 10, 2013, 4 pages.

Lee, W.C., "Crystal Structure, Dielectric and Ferroelectic Properties of (Bi0.5Na0.5)TiO3-(Ba,Sr)TiO3 Lead-Free Piezoelectric Ceramics," Journal of Alloys and Compounds, vol. 492, No. 1-2, XP026915378, Mar. 4, 2010, 6 pages.

*Primary Examiner* — Karl E Group
(74) *Attorney, Agent, or Firm* — Slater Matsil, LLP

(57) ABSTRACT

A dielectric composition, a dielectric element, an electronic component and a multi-layer electronic component are disclosed. In an embodiment the dielectric composition includes particles having a perovskite crystal structure including at least Bi, Na, Sr and Ti, wherein at least some of the particles have a core-shell structure including a core portion and a shell portion and wherein the content of Bi present in the core portion is at least 1.2 times the content of Bi present in the shell portion.

17 Claims, 4 Drawing Sheets

(51) Int. Cl.
*C04B 35/462* (2006.01)
*C04B 35/47* (2006.01)
*H01G 4/30* (2006.01)
*C04B 35/626* (2006.01)
*C04B 35/628* (2006.01)
*C04B 35/64* (2006.01)
*C04B 41/45* (2006.01)
*C04B 41/51* (2006.01)
*C04B 41/88* (2006.01)
*H01G 4/232* (2006.01)
*H01G 4/248* (2006.01)

(52) U.S. Cl.
CPC ........ *C04B 35/475* (2013.01); *C04B 35/6262* (2013.01); *C04B 35/62645* (2013.01); *C04B 35/62821* (2013.01); *C04B 35/64* (2013.01); *C04B 41/4578* (2013.01); *C04B 41/5111* (2013.01); *C04B 41/88* (2013.01); *H01G 4/1227* (2013.01); *H01G 4/30* (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3236* (2013.01); *C04B 2235/3284* (2013.01); *C04B 2235/3298* (2013.01); *C04B 2235/5445* (2013.01); *C04B 2235/602* (2013.01); *C04B 2235/656* (2013.01); *C04B 2235/768* (2013.01); *C04B 2235/77* (2013.01); *C04B 2235/80* (2013.01); *H01G 4/232* (2013.01); *H01G 4/248* (2013.01)

(56) References Cited

U.S. PATENT DOCUMENTS

| | | | |
|---|---|---|---|
| 8,778,819 | B2 | 7/2014 | Masukawa et al. |
| 9,054,310 | B2 | 6/2015 | Hoffmann et al. |
| 9,190,194 | B2 | 11/2015 | Shimada et al. |
| 2005/0260410 | A1 | 11/2005 | Fujikawa et al. |
| 2010/0195265 | A1 | 8/2010 | Nakamura et al. |
| 2017/0218268 | A1 | 8/2017 | Pickett et al. |
| 2018/0211777 | A1* | 7/2018 | Tauchi .................. C04B 35/462 |
| 2018/0211779 | A1* | 7/2018 | Hirose .................. C04B 35/47 |
| 2018/0211781 | A1* | 7/2018 | Imura .................. C04B 35/462 |
| 2018/0218837 | A1* | 8/2018 | Hirose .................. H01G 4/30 |
| 2018/0218838 | A1* | 8/2018 | Imura ................. C01G 23/006 |
| 2018/0222801 | A1* | 8/2018 | Hirose ................. C04B 35/462 |

FOREIGN PATENT DOCUMENTS

| | | |
|---|---|---|
| CN | 104529433 A | 4/2015 |
| JP | 10310469 A | 11/1998 |
| JP | 11176612 A | 7/1999 |
| JP | 200058377 A | 2/2000 |
| JP | 2005022891 A | 1/2005 |
| JP | 2006213575 A | 8/2006 |
| JP | 2009007181 A | 1/2009 |
| JP | 2009096671 A | 5/2009 |
| JP | 2012169515 A | 9/2012 |
| JP | 2013542161 A | 11/2013 |
| WO | 2007097462 A1 | 8/2007 |
| WO | 2010110201 A1 | 9/2010 |
| WO | 2013157649 A1 | 10/2013 |

* cited by examiner

DIELECTRIC COMPOSITION, DIELECTRIC ELEMENT, ELECTRONIC COMPONENT AND MULTI-LAYER ELECTRONIC COMPONENT

This patent application is a national phase filing under section 371 of PCT/EP2016/063884, filed Jun. 16, 2016, which claims the priority of Japanese patent application 2015-143395, filed Jul. 17, 2015, each of which is incorporated herein by reference in its entirety.

TECHNICAL FIELD

The present invention relates to a dielectric composition and a dielectric element comprising the same, and to an electronic component and a laminated electronic component. More specifically, the present invention relates to a dielectric composition, a dielectric element, an electronic component and a laminated electronic component which are used for applications with a relatively high rated voltage.

BACKGROUND

In recent years there has been an increasing demand for miniaturization of dielectric elements and improved reliability as electronic circuits reach higher densities. Electronic components such as laminated ceramic capacitors are rapidly becoming more compact, achieving higher capacity, and becoming more reliable while the applications of electronic components such as laminated ceramic capacitors are also expanding. As these applications expand, various electrical characteristics are required, such as temperature characteristics of capacitance in a laminated ceramic capacitor, capacitance during application of a DC electric field (DC bias), resistivity and reliability. In particular, in order to achieve miniaturization and increased capacity in a ceramic capacitor for medium- and high-voltage usage, which is employed at a high rated voltage (e.g., 100 V or more), improvements in dielectric constant during application of a DC bias, resistivity and reliability are required of dielectric compositions forming the dielectric layers of a ceramic capacitor for medium- and high-voltage usage.

In order to respond to the various requirements such as those mentioned above, various types of dielectric compositions comprising $BaTiO_3$ (which has a high dielectric constant) as the main component have been investigated as dielectric compositions which are employed in laminated ceramic capacitors. Among these, it is known that dielectric compositions having a structure in which an auxiliary component is diffused in the surface region of $BaTiO_3$ particles (what is known as a "core-shell" structure) can improve electrical characteristics such as the temperature characteristics of dielectric constant, by controlling the composition and diffusion range of the shell portion which constitutes the auxiliary component diffusion phase.

For example, the laminated ceramic capacitor described in Japanese Patent Application JP 2000-58377 A has a main component in a dielectric ceramic layer represented by the following compositional formula: $\{Ba_{1-x}Ca_xO\}_mTiO_2 + \alpha Re_2O_3 + \beta MgO + \gamma MnO$ (where $Re_2O_3$ is at least one selected from among $Y_2O_3$, $Gd_2O_3$, $Tb_2O_3$, $Dy_2O_3$, $Ho_2O_3$, $Er_2O_3$ and $Yb_2O_3$; $\alpha$, $\beta$ and $\gamma$ express molar ratios such that $0.001 \leq \alpha \cdot 0.10$, $0.001 \leq \beta 0.12$ and $0.001 < \gamma 0.12$; and $1.000 < m \leq 1.035$ and $0.005 < x \leq 0.22$). The content of alkali metal oxide in the $\{Ba_{1-x}Ca_xO\}_mTiO_2$ starting material used in the dielectric ceramic layer is no greater than 0.02 wt %.

The composition contains 0.2-5.0 parts by weight of either a first auxiliary component or a second auxiliary component with respect to 100 parts by weight of the main component. The first auxiliary component is an oxide of $Li_2O$—$(Si,Ti)O_2$-MO (where MO is at least one selected from $Al_2O_3$ and $ZrO_2$). The second auxiliary component is an oxide of $SiO_2$—$TiO_2$—XO (where XO is at least one selected from among BaO, CaO, SrO, MgO, ZnO and MnO).

An internal electrode of the laminated ceramic capacitor described in Japanese Patent Application JP 2000-58377 A further comprises nickel or a nickel alloy.

The laminated ceramic capacitor described in Japanese Patent Application JP 2000-58377 A has a core-shell structure in which an auxiliary component is diffused in the region of the grain boundary, and has a core portion in which some of the $BaTiO_3$ constituting the main component of the dielectric ceramic layer is substituted with $CaTiO_3$, and as a result it is possible to restrict a reduction in the dielectric constant when a DC bias is applied and to adequately increase reliability and resistivity when a DC bias is applied.

However, when a high DC bias of 5 kV/mm or greater is applied, the proportion of the domain which undergoes polarization reversal (the region in which the direction of the polarization axis is arranged within the crystal particles) increases because the coercive electric field of the main-component $BaTiO_3$ is low. That is to say, the direction of the polarization axis in the domain is likely to be arranged in the direction of application of DC bias. It is generally known that there is a reduction in dielectric constant as a result of the direction of the polarization axis in the domain being arranged in the direction of application of DC bias.

Furthermore, it is also assumed that laminated ceramic capacitors will be used in the future under higher ambient temperatures and higher voltages. Further improvements in the electrical characteristics would therefore be desirable.

SUMMARY OF THE INVENTION

Embodiments of the present invention provide a dielectric composition which can be used in a power supply circuit having a high rated voltage, wherein the dielectric composition has a high DC bias resistivity and a high dielectric constant when a DC bias is applied, and also has a favourable high-temperature load lifespan. Further embodiment of the present invention also provide a dielectric element comprising said dielectric composition, an electronic component and a laminated electronic component.

Embodiments of the present invention comprises particles having a perovskite crystal structure including at least Bi, Na, Sr and Ti, wherein: at least some of the particles have a core-shell structure comprising a core portion and a shell portion; and the content of Bi present in the core portion is at least 1.2 times the content of Bi present in the shell portion.

By virtue of this feature, the dielectric composition according to embodiments of the present invention makes it possible to achieve a high dielectric constant and high resistivity when a DC bias is applied, while simultaneously achieving a favourable high-temperature load lifespan.

In various embodiments S1:S2=1:99-20:80 in the cross section of the dielectric composition, where S1 is the mean cross-sectional area of the core portions and S2 is the mean cross-sectional area of the shell portions. This makes it possible to further improve the resistivity when a DC bias is applied and the high-temperature load lifespan.

In various other embodiments the total cross-sectional area of the core portions is 0.1%-15% with respect to the dielectric composition as a whole, in the cross section of the dielectric composition. This makes it possible to further improve the resistivity when a DC bias is applied and the high-temperature load lifespan.

In yet further embodiments $0.125 \leq \alpha \leq 2.00$, where $\alpha$ is the molar ratio of Bi with respect to Sr in the dielectric composition. This makes it possible to further improve the dielectric constant when a DC bias is applied.

In yet other embodiments the dielectric composition comprises at least one selected from among La, Ce, Pr, Nd, Sm, Eu, Gd, Tb, Dy, Ho, Yb, Ba, Ca, Mg and Zn. This makes it possible to improve the DC bias characteristics which will be described later.

A dielectric element according to embodiments of the present invention is provided with the abovementioned dielectric composition.

An electronic component according to embodiments of the present invention is provided with a dielectric layer comprising the abovementioned dielectric composition.

A laminated electronic component according to embodiments of the present invention has a laminated portion formed by alternately laminating an internal electrode layer and a dielectric layer comprising the abovementioned dielectric composition.

Preferred embodiments of the present invention will be described below with reference to the figures. It should be noted that the present invention is not limited to the following embodiments. Furthermore, the constituent elements described below include elements which can be readily envisaged by a person skilled in the art and also elements which are substantially the same. In addition, the constituent elements described below may be combined, as appropriate.

DETAILED DESCRIPTION OF ILLUSTRATIVE EMBODIMENTS

Figure 1:
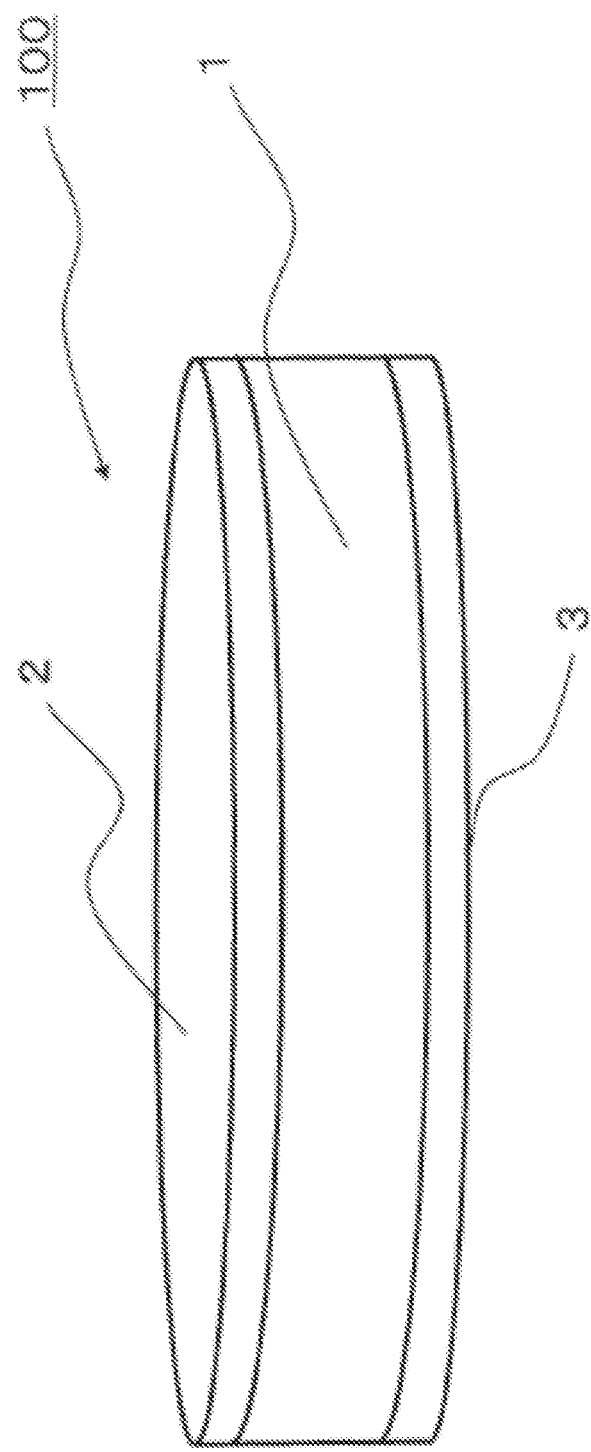
FIG. 1 is a schematic diagram of a ceramic capacitor according to an embodiment of the present invention.

FIG. 1 is a schematic diagram of a single-layer ceramic capacitor according to an embodiment of the present invention.

As shown in FIG. 1, a capacitor 100 according to an embodiment of the present invention comprises a disc-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 comprises a dielectric composition according to this embodiment. There is no particular limitation as to the material of the electrodes 2, 3. For example, Ag, Au, Cu, Pt, Ni or the like may be used, but other metals may also be used.

Figure 2:
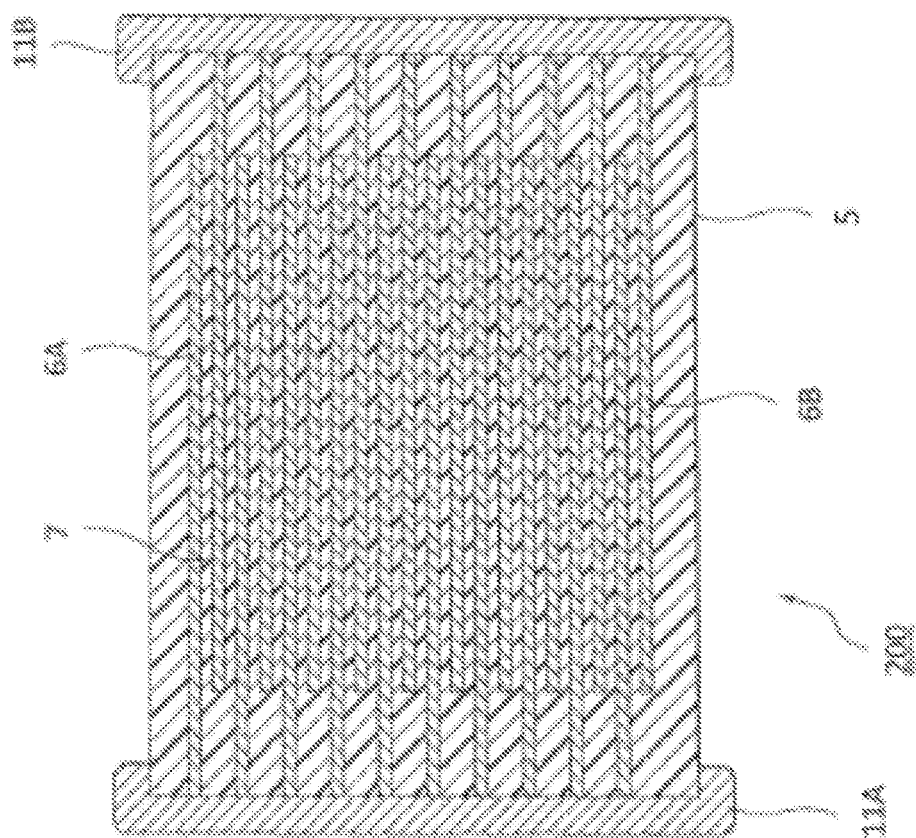
FIG. 2 is a view in cross section of a laminated ceramic capacitor according to a different embodiment of the present invention.

FIG. 2 is a schematic cross-sectional diagram of a laminated ceramic capacitor according to a different embodiment of the present invention.

As shown in FIG. 2, a laminated ceramic capacitor 200 according to a different embodiment of the present invention comprises a capacitor element main body 5 having a structure in which dielectric layers 7 and internal electrode layers 6A, 6B are alternately stacked. A pair of terminal electrodes 11A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

There is no particular limitation as to the material of the internal electrode layers 6A, 6B. For example, a metal such as Au, Pt, Ag, Ag—Pd alloy, Cu or Ni etc. may be used, but it is also possible to use other metals.

The terminal electrodes 11A, 11B are provided at the end surfaces of the laminated body 5 in contact with the ends of the internal electrode layers 6A, 6B which are exposed at said end surfaces. By virtue of this structure, the terminal electrodes 11A, 11B are electrically connected to the internal electrode layers 6A, 6B, respectively. The terminal electrodes 11A, 11B may comprise a conductive material having Ag, Au, Cu or the like as the main component thereof. There is no particular limitation as to the thickness of the terminal electrodes 11A, 11B. The thickness thereof is appropriately set in accordance with the application and the size of the laminated dielectric element, among other things. The thickness of the terminal electrodes 11A, 11B may be set at 10-50 µm, for example.

The dielectric layers 7 comprise the dielectric composition according to this embodiment. The thickness of each dielectric layer 7 may be freely set and there is no particular limitation. The thickness may be set at 1-100 µm, for example.

Here, the dielectric composition according to this embodiment comprises particles having a perovskite crystal structure including at least Bi, Na, Sr and Ti, said dielectric composition being characterized in that at least some of the particles have a core-shell structure comprising a core portion and a shell portion, and the content of Bi present in the core portion is at least 1.2 times the content of Bi present in the shell portion. It should be noted that the dielectric composition according to this embodiment is a sintered dielectric composition.

As indicated above, the dielectric composition according to this embodiment comprises particles having a perovskite crystal structure including at least Bi, Na, Sr and Ti. These particles have a higher coercive electric field and a lower dielectric constant when a DC bias is not applied, in comparison with a BaTiO$_3$-based composition. However, the dielectric constant of the dielectric composition according to this embodiment when a DC bias is not applied is sufficiently high that there is no problem on an industrial level.

The dielectric composition having a perovskite crystal structure is a polycrystalline material comprising, as the main phase, a perovskite compound represented by the general formula ABO$_3$. The A site includes at least one selected from Bi, Na and Sr, while the B site includes at least Ti.

If the whole of A is taken as 100 at. %, the proportion of Bi, Na, Sr contained in A is preferably a total of at least 800 at. %. Furthermore, if the whole of B is taken as 100 at. %, the proportion of T contained in B is preferably at least 800 at. %.

Figure 3:
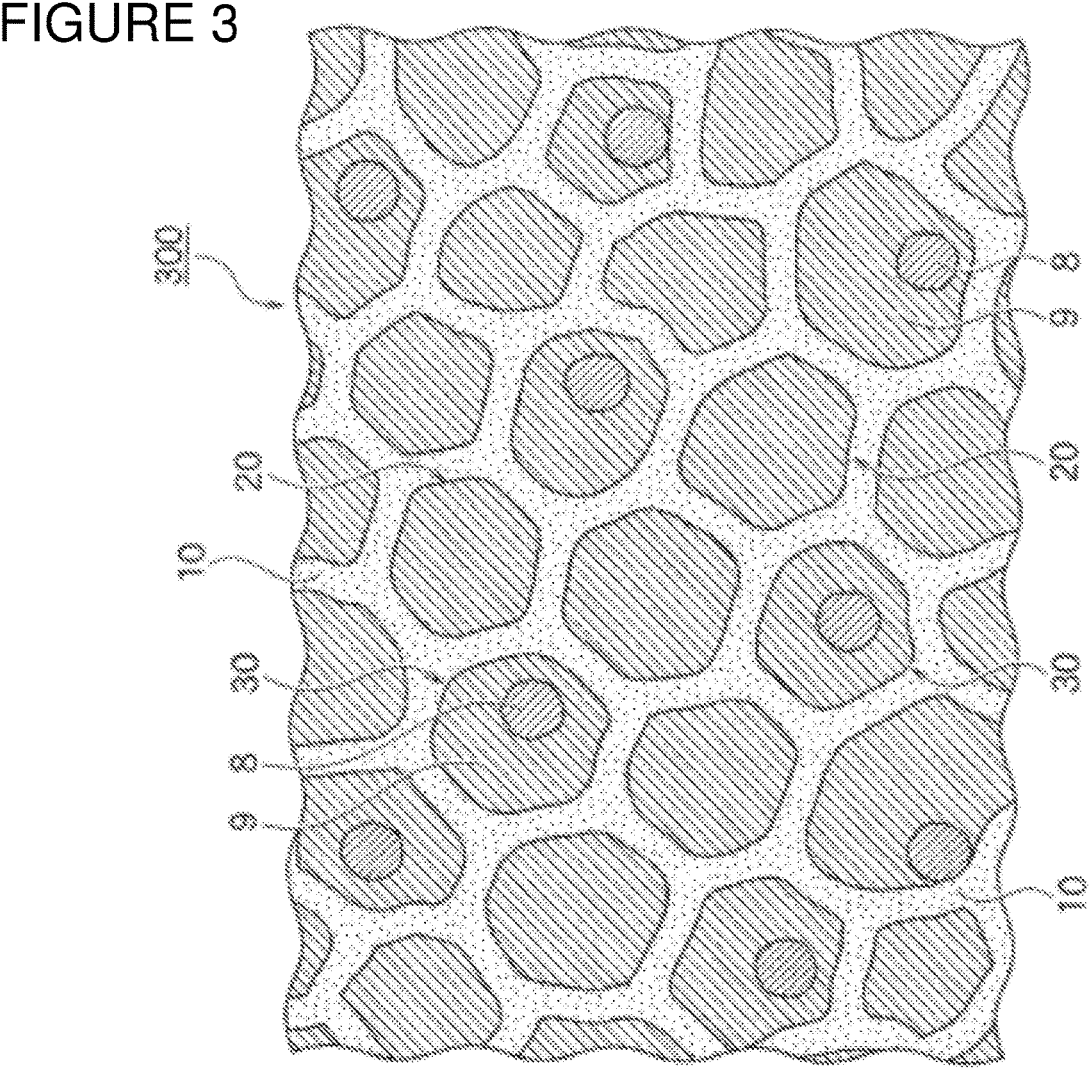
FIG. 3 is a schematic diagram of a dielectric composition according to an embodiment of the present invention.

FIG. 3 is a schematic diagram of particles in a dielectric composition 300 according to this embodiment. The dielectric composition 300 according to this embodiment comprises single-phase particles 20 which do not have a core-shell structure, and core-shell particles 30 which have a core-shell structure.

A grain boundary 10 is present between particles. The core-shell particles 30 comprise a shell portion 9 surrounding a core portion 8, and there are forms of particles in which the core portion 8 is completely contained within the shell portion 9, and in which part of the core portion 8 is in contact with the grain boundary 10 while another part of the core portion 8 is contained within the shell portion 9. It should be noted that there is no limitation as to the number of core portions 8 included in a single core-shell particle 30. There is often only one core portion 8 contained in a single core-shell particle 30, but there may equally be two or more.

Core-shell particles in which the content of Bi present in the core portion 8 is at least 1.2 times the content of Bi present in the shell portion 9 (also referred to below as "specific core-shell particles") are present among the core-shell particles 30 contained in the dielectric composition 300 according to this embodiment.

A method for determining whether or not particles contained in the dielectric composition 300 according to this embodiment are core-shell particles 30, and a method for determining whether or not said core-shell particles 30 are specific core-shell particles will be described below.

There is no particular limitation as to the method for distinguishing whether or not particles contained in the dielectric composition 300 according to this embodiment are core-shell particles 30. For example, a distinction may be made by observing a cross section cut on any plane of the dielectric composition 300 by scanning transmission electron microscopy (STEM), performing element mapping by means of energy dispersive X-ray spectroscopy (EDS), and confirming the contrast in the element mapping image. In addition, it is also possible to distinguish between the core portion 8 and the shell portion 9 of the core-shell particles 30 at this stage. Furthermore, it may be possible to distinguish whether or not each particle is a core-shell particle 30 even in a reflected electron image from scanning electron microscopy (SEM), and it may be possible to distinguish between the core portion 8 and the shell portion 9 in the core-shell particles 30.

There is no particular limitation as to the method for setting the observation field for STEM and EDS, but the size of the observation field is preferably at least 2 µm×at least 2 µm, and the magnification of the observation field is preferably between 10 000 times and 100 000 times.

Figure 4:
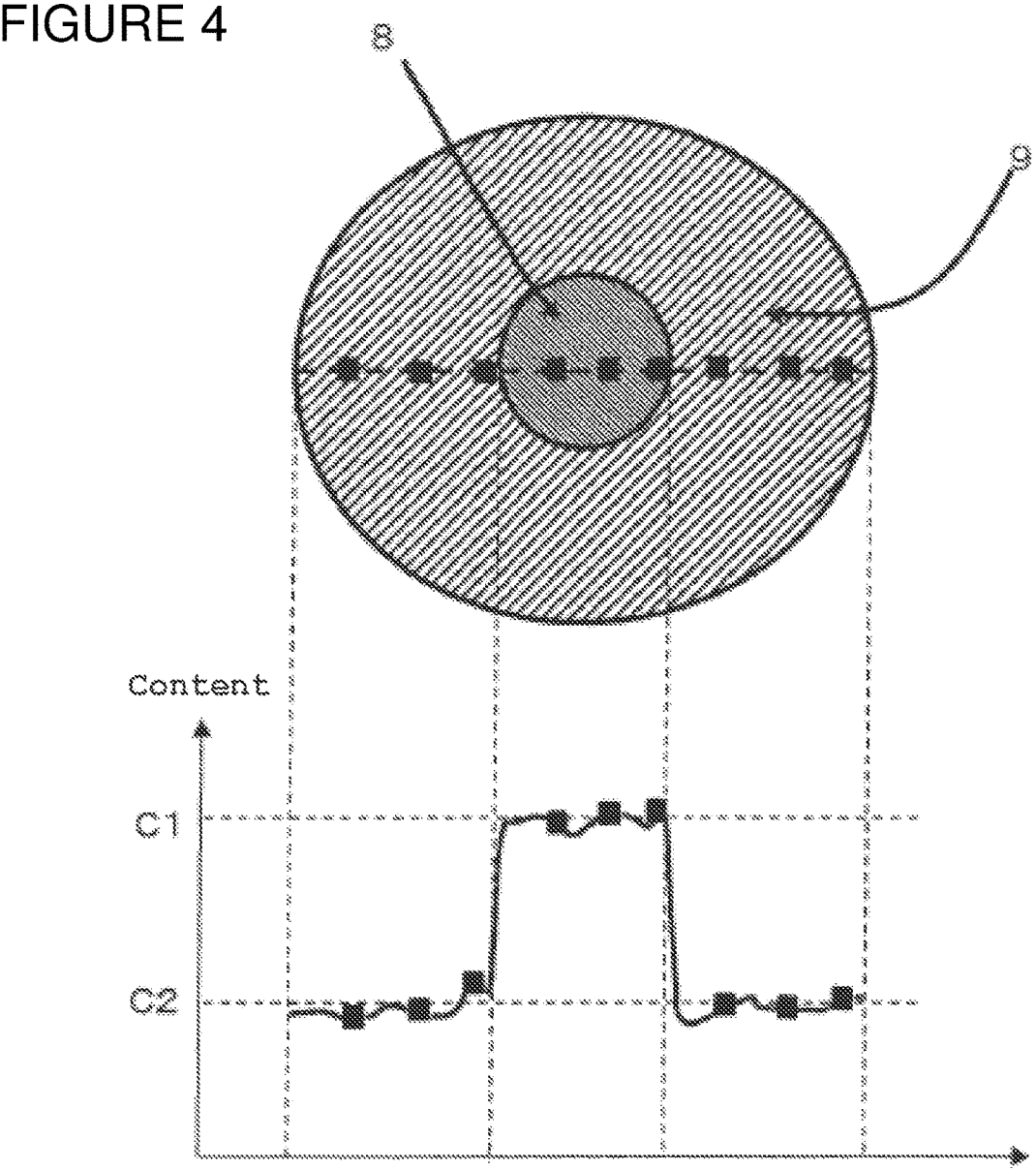
FIG. 4 is a schematic diagram to illustrate a method for measuring the Bi content in each region.

In addition, as shown in FIG. 4, for example, measurement points may be freely set for the core portion 8 and the shell portion 9 in the core-shell particles 30, and a point analysis may be conducted in order to calculate the content of each element at each measurement point. In addition, by averaging the content of each element at each measurement point, it is possible to calculate the content of each element in the core portion 8 (C1 in FIG. 4) and the content of each element in the shell portion 9 (C2 in FIG. 4).

It should be noted that the actual number of measurement points is greater than the number shown in FIG. 4. A minimum of 10 measurement points is set for each core portion. Furthermore, a minimum of 10 measurement points is set for each shell portion.

There is no particular limitation as to the method for setting the measurement points. For example, it is also possible to measure the Bi content in all the pixels in regions in which the Bi content is measured by element mapping, and then to calculate the Bi content in each region from the Bi content in all the pixels.

It should be noted that the amount of specific core-shell particles produced may be controlled, as appropriate, in accordance with the make-up of the dielectric composition and the method for producing same, and in accordance with the baking conditions. For example, it is possible to promote formation of the specific core-shell particles by incorporating particles having a large particle size in the starting material powder. Furthermore, it is possible to form the specific core-shell particles by reducing the baking temperature for cases in which the dielectric composition is to become a densified ceramic.

The dielectric composition 300 according to this embodiment contains the specific core-shell particles and as a result demonstrates an effect of markedly improving the dielectric constant and DC bias resistivity when a DC bias is applied, and also of improving the high-temperature load lifespan. In addition, a dielectric element, an electronic component and a laminated electronic component comprising the dielectric composition 300 according to this embodiment are advantageously used in a power supply circuit or the like having a high rated voltage. Furthermore, the proportion of specific core-shell particles with respect to the total number of particles in the dielectric composition 300 (number of specific core-shell particles/total number of particles) is preferably at least 0.01.

On the other hand, if the specific core-shell particles are not included, there is a reduction in the dielectric constant and DC bias resistivity when a DC bias is applied, and/or a reduction in the high-temperature load lifespan.

The cross-sectional area occupied by the core portion 8 and the cross-sectional area occupied by the shell portion 9 are then calculated in the abovementioned observation field. There is no particular limitation as to the method for obtaining said cross-sectional areas. For example, said cross-sectional areas may be calculated by subjecting an element mapping image to image processing, selecting an area region for which the cross-sectional area is to be obtained, counting the number of pixels occupying that region, and multiplying the area per pixel.

The particles 30 having a core-shell structure contained in the dielectric composition 300 according to this embodiment are preferably such that S1:S2=1:99-20:80, where S1 is the mean cross-sectional area occupied by the core portion 8 and S2 is the mean cross-sectional area occupied by the shell portion 9. It should be noted that the mean cross-sectional area occupied by the core portion 8 is the mean of the cross-sectional areas of the core portions 8 contained in each of the core-shell particles 30. Furthermore, the cross-sectional area occupied by the shell portion 9 is the mean of the cross-sectional areas of each shell portion 9 contained in each of the particles 30 having a core-shell structure.

The dielectric composition 300 according to this embodiment is such that S1:S2=1:99-20:80, and as a result it is possible to further improve the DC bias resistivity and high-temperature load lifespan.

It should be noted that S1:S2 may be controlled, as appropriate, in accordance with the make-up of the dielectric composition 300 and the method for producing same, and also the baking conditions. For example, by incorporating particles having a large particle size in the starting material powder, it is possible to increase S1 in S1:S2. Furthermore, it is possible to increase S1 in S1:S2 by reducing the baking temperature for cases in which the dielectric composition 300 is to become a densified ceramic.

The sum total of the cross-sectional areas of the core portions 8 in the dielectric composition 300 according to this embodiment is more preferably 0.1%-15% with respect to the cross-sectional area of the dielectric composition 300 as a whole.

The dielectric composition 300 according to this embodiment is such that the sum total of the cross-sectional areas of the core portions 8 is 0.1%-15% with respect to the cross-sectional area of the dielectric composition 300 as a whole, and as a result it is possible to further improve the DC bias resistivity and high-temperature load lifespan.

It should be noted that the sum total of the cross-sectional areas of the core portions 8 may be controlled, as appropriate, in accordance with the make-up of the dielectric composition 300 and the method for producing same, and also the baking conditions. For example, by incorporating particles having a large particle size in the starting material powder, it is possible to increase the sum total of the cross-sectional areas of the core portions 8. Furthermore, it is possible to increase the sum total of the cross-sectional areas of the core portions 8 by reducing the baking temperature for cases in which the dielectric composition 300 is to become a densified ceramic.

The dielectric composition 300 according to this embodiment is preferably such that $0.125 \leq \alpha \leq 2.00$, where $\alpha$ is the molar ratio of Bi with respect to Sr(Bi/Sr).

The dielectric composition 300 according to this embodiment satisfies $0.125 \leq \alpha \leq 2.00$, and therefore it is possible to improve the dielectric constant when a DC bias is applied.

The dielectric composition 300 according to this embodiment preferably contains at least one selected from among La, Ce, Pr, Nd, Sm, Eu, Gd, Tb, Dy, Ho, Yb, Ba, Ca, Mg and Zn (also referred to below as a "first auxiliary component"). The amount of the first auxiliary component contained in the dielectric composition 300 according to this embodiment is more preferably 1.0-15 molar parts, taking the Ti content as too molar parts.

The dielectric composition 300 according to this embodiment contains the abovementioned first auxiliary component, and as a result the DC bias characteristics can be improved. Here, the DC bias characteristics according to this application are obtained by calculating the proportion of change in the dielectric constant when a DC bias is not applied and when it is applied. A smaller absolute value for the DC bias characteristics is preferable.

The dielectric composition 300 according to this embodiment preferably contains Li (also referred to below as a "second auxiliary component"). The amount of the second auxiliary component contained in the dielectric composition 300 according to this embodiment is more preferably 0.1-5.0 molar parts, taking the Ti content as too molar parts.

The dielectric composition 300 according to this embodiment contains the abovementioned second auxiliary component, and as a result the DC bias resistivity and the high-temperature load lifespan can be improved.

An example of a method for producing the laminated ceramic capacitor 200 shown in FIG. 2 will be described below.

There is no particular limitation as to the method for producing the laminated ceramic capacitor 200 according to this embodiment. For example, it is produced in the same way as a conventional laminated ceramic capacitor, namely by preparing a green chip using a normal sheet method or printing method employing a paste, baking the green chip and then printing or transcribing external electrodes and then baking.

There is no particular limitation as to the type of paste for the dielectric ceramic layers. For example, said paste may be an organic paint comprising a mixture of a dielectric starting material and an organic vehicle, or it may be an aqueous paint comprising a mixture of a dielectric starting material and an aqueous vehicle.

For the dielectric starting material, it is possible to use a metal contained in the abovementioned dielectric composition, for example, an oxide of a metal selected from the group consisting of Bi, Na, Sr, Ti, La, Ce, Pr, Nd, Sm, Eu, Gd, Tb, Dy, Ho, Yb, Ba, Ca, Mg, Zn and Li, or a mixture thereof, or a composite oxide may be used. In addition, the dielectric starting material may be appropriately selected from various types of compounds which form the abovementioned oxides or composite oxides as a result of baking, e.g., carbonates, oxalates, nitrates, hydroxides and organometallic compounds etc. and these may be mixed for use.

When the paste for the dielectric layers is an organic paint, the dielectric starting material and an organic vehicle in which a binder or the like is dissolved in an organic solvent should be mixed. There is no particular limitation as to the binder which is used in the organic vehicle, and it may be appropriately selected from various conventional binders such as ethyl cellulose and polyvinyl butyral. Furthermore, there is no particular limitation as to the organic solvent which is used in the organic vehicle, and it may be appropriately selected from various types of organic solvents such as terpineol, butyl carbitol, acetone and toluene, in accordance with the method which is used, namely the printing method or sheet method etc.

Furthermore, when the paste for the dielectric layers is an aqueous paint, the dielectric starting material and an aqueous vehicle in which a water-soluble binder and a dispersant etc. are dissolved in water should be mixed. There is no particular limitation as to the water-soluble binder which is used in the aqueous vehicle, and said water-soluble binder may be appropriately selected from various types of binders such as polyvinyl alcohol, cellulose and water-soluble acrylic resin.

The paste for the internal electrode layers is prepared by mixing a conductive material comprising metals such as Au, Pt, Ag, Ag—Pd alloy, Cu or Ni, or various types of oxide which form the conductive material after baking, organometallic compounds, resinates, and the like, with the abovementioned organic vehicle or aqueous vehicle. The paste for the external electrodes may be prepared in the same way as the paste for the internal electrode layers.

When an organic vehicle is used to prepare the abovementioned pastes, there is no particular limitation as to the content of said organic vehicle. For example, the binder may be present in an amount of the order of 1-5 wt % and the organic solvent may be present in an amount of the order of 10-50 wt %. Furthermore, the pastes may contain additives selected from various types of dispersants, plasticizers, dielectrics, and insulators etc., as required. The total content of these additives is preferably no greater than 10 wt %.

When a printing method is used, the paste for the dielectric layers and the paste for the internal electrode layers are printed in layers on a substrate made of polyethylene terephthalate (PET) or the like and cut to a predetermined shape, after which they are peeled from the substrate to form a green chip. Furthermore, when the sheet method is used, a green sheet is formed using the paste for the dielectric layers, and the paste for the internal electrode layers is printed on the green sheet, after which the green sheets are peeled, stacked and cut to form a green chip.

Before the green chip is baked, a debinding treatment is performed. There is no particular limitation as to the conditions of the debinding treatment and it should be carried out under normal conditions.

The debinding treatment is preferably carried out under a reducing atmosphere when a base metal alone or an alloy comprising a base metal, such as Cu or Cu alloy, is used for the conductive material of the internal electrode layers. There is no particular limitation as to the type of reducing atmosphere, and it is possible to use humidified $N_2$ gas or a mixed gas comprising humidified $N_2$ and $H_2$, among others.

There is no particular limitation as to the temperature increase rate, holding temperature and temperature holding time in the debinding treatment. The temperature increase rate is preferably 0.1-100° C./hr and more preferably 1-10° C./hr. The holding temperature is preferably 200-500° C. and more preferably 300-450° C. The temperature holding time is preferably 1-48 hours and more preferably 2-24 hours. The organic component such as the binder component is preferably removed down to around 300 ppm by means of the debinding treatment, and more preferably removed down to around 200 ppm.

The atmosphere when the green chip is baked to obtain the capacitor element main body should be appropriately determined in accordance with the type of conductive material in the paste for the internal electrode layers.

When a base metal alone or an alloy comprising a base metal, such as Cu or Cu alloy, is used as the conductive material in the paste for the internal electrode layers, the oxygen partial pressure in the baking atmosphere is preferably set at $10^{-6}$ to $10^{-8}$ atm. By setting the oxygen partial pressure at $10^{-8}$ atm or greater, it is possible to restrict degradation of the components forming the dielectric layers and to restrict a reduction in the resistivity. Furthermore, by setting the oxygen partial pressure at $10^{-6}$ atm or less, it is possible to restrict oxidation of the internal electrode layers.

Furthermore, the holding temperature during baking is 900-1400° C., preferably 900-1100° C., and more preferably 950-1050° C. By setting the holding temperature at 900° C. or greater, this makes densification more likely to progress adequately due to baking. Furthermore, when the holding temperature is set at 1100° C. or less, this facilitates suppressing diffusion of the various materials forming the internal electrode layers and abnormal sintering of the internal electrode layers. By suppressing abnormal sintering of the internal electrode layers, this facilitates preventing breakage of the internal electrodes. By suppressing diffusion of the various materials forming the internal electrode layers, this facilitates preventing deterioration of the DC bias characteristics.

Furthermore, there is no particular limitation as to the baking atmosphere. The baking atmosphere is preferably a reducing atmosphere so as to restrict oxidation of the internal electrode layers. There is no particular limitation as to the atmospheric gas. A mixed gas comprising $N_2$ and $H_2$ which is humidified is preferably used as the atmospheric gas, for example. Furthermore, there is no particular limitation as to the baking time.

Annealing (reoxidation) may be carried out after the baking during the production of the laminated ceramic capacitor according to this embodiment. The annealing should be carried out under normal conditions. There is no particular limitation as to the annealing atmosphere. Humidified $N_2$ gas or a mixed gas comprising humidified $N_2$ and $H_2$ etc., may be used, for example.

A wetter or the like should be used in order to humidify the $N_2$ gas or the mixed gas comprising $N_2$ and $H_2$ etc. in the abovementioned debinding treatment, baking and annealing. In this case, the water temperature is preferably around 20-90° C.

The debinding treatment, baking and annealing may be carried out successively or independently. When these processes are performed successively, the following procedure is preferred, namely that the debinding treatment is performed, after which the atmosphere is modified without cooling and then baking is carried out by raising the temperature to the holding temperature for baking. On the other hand, when these processes are performed independently, the following procedure is preferred, namely that during baking the temperature is raised under an $N_2$ gas atmosphere to the holding temperature for the debinding treatment, after which the atmosphere is modified and temperature increase is further continued, and then after baking cooling is performed to the holding temperature for the debinding treatment, after which the atmosphere is once again modified to an $N_2$ gas atmosphere and cooling is further continued. It should be noted that the abovementioned $N_2$ gas may or may not be humidified.

The end surfaces of the capacitor element main body obtained in this way are polished by means of barrel polishing or sandblasting, for example, the paste for the external electrodes is printed or transcribed thereon, baking is carried out and the external electrodes are formed. The paste for the external electrodes is preferably baked at 600-800° C. for around to minutes to 1 hour under a humidified mixed gas comprising $N_2$ and $H_2$, for example. A coating layer is then formed by means of plating or the like on the external electrode surface, as required. The laminated ceramic capacitor 200 shown in FIG. 2 can be produced by the abovementioned method.

Furthermore, the ceramic capacitor 100 shown in FIG. 1 can be produced using a conventional method for producing a ceramic capacitor.

A ceramic capacitor and a laminated ceramic capacitor according to an embodiment of the present invention were described above. The dielectric composition according to embodiments of the present invention simultaneously provides a high dielectric constant when a high DC bias is applied, and also high resistivity and high reliability, so said dielectric composition can be advantageously used for medium- and high-voltage capacitors with a relatively high rated voltage, for example.

Furthermore, the present invention is not limited to the abovementioned embodiments. For example, the dielectric layer comprising the dielectric composition according to embodiments of the present invention may also be used as a dielectric element or the like for a semiconductor device.

Furthermore, according to embodiments the present invention, a conventional configuration may be freely used, apart from the make-up of the dielectric composition. Furthermore, the calcined powder may be produced by means of a known method such as hydrothermal synthesis when the ceramic capacitor is produced, for example.

The dielectric element, electronic component and laminated electronic component according to embodiments of the present invention are advantageously used in a location where a relatively high rated voltage is applied. For example, they may be advantageously used in a power supply circuit having a high rated voltage, such as a DC-DC converter or an AC-DC inverter, etc.

Embodiments of the present invention makes it possible to provide a dielectric composition simultaneously having a dielectric constant of 800 or greater in a state in which a DC bias of 8 kV/mm is applied, for example, a DC bias resistivity of $1 \times 10^{12}$ Ωcm or greater, and a high-temperature load lifespan of 20 hours or greater when a DC voltage of 50 V/μm is applied at 150° C., and also a dielectric element employing said dielectric composition, an electronic component and a laminated electronic component.

In addition, the dielectric element, electronic component and laminated electronic component according to embodiments of the present invention are also of use in a smoothing capacitor or a snubber capacitor for circuit protection for which there is a need for a high dielectric constant when a high DC bias is applied.

In addition, the dielectric composition according to embodiments of the present invention does not contain lead. The inventive dielectric composition, dielectric element, electronic component and laminated electronic component are therefore also superior from an environmental point of view.

Embodiments of the present invention will be described below in further detail with the aid of exemplary embodiments and comparative examples. However, the present invention is not limited by the following exemplary embodiments.

Exemplary Embodiments 1-19 and Comparative Examples 1-3

The following powders were prepared as starting materials: bismuth oxide ($Bi_2O_3$), sodium carbonate ($Na_2CO_3$), strontium carbonate ($SrCO_3$), barium carbonate ($BaCO_3$), calcium carbonate ($CaCO_3$), magnesium carbonate ($MgCO_3$), zinc oxide (ZnO), lanthanum hydroxide (La$(OH)_3$), neodymium oxide ($Nd_2O_3$), samarium oxide ($Sm_2O_3$), gadolinium oxide ($Gd_2O_3$) and titanium oxide ($TiO_2$).

The abovementioned starting material powders were weighed out in such a way that the baked dielectric compositions (sintered compacts) formed a perovskite composition containing Sr, Na, Bi and Ti.

The weighed starting material powders were then wet-mixed using a ball mill to obtain mixtures, after which the resulting mixtures were calcined for two hours under the air at 750-850° C. to obtain calcined material. The calcined material was then wet-ground using a ball mill to obtain calcined powders.

An organic solvent and an organic vehicle were then added to the calcined powders, the material was wet-mixed using a ball mill and paste for dielectric layers was prepared. At the same time, Ag powder, Ag—Pd alloy powder or Cu powder was mixed with an organic vehicle as a conductive material powder, and various pastes for internal electrode layers comprising Ag, Ag—Pd alloy or Cu were prepared. The paste for dielectric layers was then moulded into sheets by means of a sheet-moulding method and ceramic green sheets were obtained.

The paste for the internal electrode layers was coated on the ceramic green sheets by means of screen printing to print the internal electrode layers. The ceramic green sheets on which the internal electrode layers had been printed were then stacked, after which they were cut into blocks, whereby laminated green chips were prepared. The laminated green chips were subjected to debinding at 300° C.-500° C. to remove the organic component down to around 300 ppm. After the debinding, baking was carried out under the atmosphere or under a reducing atmosphere at a baking temperature of 900° C.-1400° C. The baking time was varied as appropriate. A mixed gas comprising humidified $N_2$ and $H_2$ was used as the atmospheric gas when baking was carried out under a reducing atmosphere. After the baking, the exposed surfaces of the internal electrodes were polished, a paste for the external electrodes having Ag or Cu as a conductive material was applied thereto, and laminated ceramic capacitors were obtained.

The size of the resulting laminated ceramic capacitors was 3.2 mm×1.6 mm×0.6 mm, the thickness of the dielectric layers was 20 μm, and the thickness of the internal electrode layers was 1.5 μm. Four dielectric layers were interposed between the internal electrode layers.

It should be noted that when the dielectric layers of the baked laminated green chips were dissolved by means of a solvent and analysed by means of ICP optical emission spectroscopy, it was confirmed that the molar ratio of Sr with respect to Bi was equal to the values shown in table 1.

The cross section at the intersection of the internal electrodes was cut, and the crystal structure of the dielectric layers at that cross section was measured and analysed by means of X-ray diffraction employing an XRD measurement apparatus (SmartLab; Rigaku Corporation). As a result, it was confirmed that the dielectric layers had a perovskite crystal structure.

The cross section cut from the laminated ceramic capacitor was then cut into flakes by means of a gallium ion beam to prepare samples for cross-sectional observation.

The resulting samples for cross-sectional observation were observed for particles by means of scanning transmission electron microscopy (STEM; JEM-2100F; JEOL), and core-shell particles present in the observation field were identified. In addition, energy dispersive X-ray spectroscopy (EDS) was performed in the same observation field, and it was confirmed whether or not core-shell particles in which the Bi content present in the core portion was at least 1.2 times the Bi content present in the shell portion (specific core-shell particles) were present in the core-shell particles identified by STEM. It should be noted that the size of the observation field was 5 μm×5 μm and the magnification of the observation field was 40 000 times. Furthermore, a plurality of observation fields were set.

Specifically, a compositional analysis was performed at least at to points in the core portion of the core-shell particles identified by STEM, and the mean Bi content at each point was taken as the Bi content present in the core portion. A compositional analysis was also performed in the same way at least at to points in the shell portion, and the mean Bi content at each point was taken as the Bi content present in the shell portion. The Bi content present in the core portion and the Bi content present in the shell portion were then compared. It was confirmed whether or not core-shell particles in which the Bi content present in the core portion was at least 1.2 times the Bi content present in the shell portion (specific core-shell particles) were present. It should be noted that in Exemplary Embodiments 1-19 to be described later, the proportion of the number of specific core-shell particles with respect to the total number of particles in the observation field was no less than 0.01.

It should be noted that in the exemplary embodiments, it was assumed that specific core-shell particles were not present in the dielectric composition as a whole when the specific core-shell particles were not present in the observation field. Furthermore, the total proportion of the cross-sectional area of the core portions and S1, S2 (to be described later) were not calculated for comparative examples in which the specific core-shell particles were absent.

In addition, the mean cross-sectional area of the core portion (S1) and the mean cross-sectional area of the shell portion (S2) were measured in the core-shell particles identified by means of STEM, and S1:S2 were calculated. In addition, the total of the cross-sectional area of the core portions and the cross-sectional area of the dielectric composition as a whole were measured, and the total proportion of the cross-sectional area of the core portions was calculated. It should be noted that the area in each region was calculated by counting the number of pixels in each region and multiplying the number of pixels in each region by the area per pixel.

The dielectric constant ε1 (no units) of the laminated ceramic capacitor was calculated from the capacitance measured from conditions of room temperature at 25° C., frequency 1 kHz, input signal level (measurement voltage) 1.0 Vrms, and distance between electrodes of the laminated ceramic capacitor and effective surface area of the electrodes, using a digital LCR meter (Hewlett-Packard; 4284A).

The dielectric constant ε2 (no units) of the laminated ceramic capacitor was calculated from the capacitance measured from conditions of room temperature at 25° C., frequency 1 kHz, and input signal level (measurement voltage) 1.0 Vrms, effective surface area of the electrodes, distance between electrodes, and vacuum dielectric constant, while a DC bias generator (GLASSMAN HIGH VOLTAGE; WX10P90) was connected to a digital LCR meter (Hewlett-Packard; 4284A) and a DC bias of 8 V/μm was applied to a laminated ceramic capacitor sample. A higher value for the dielectric constant ε2 was preferable, and a value of 800 or greater was deemed to be good in the present exemplary embodiments.

The DC bias characteristics were calculated by means of the following formula (1) using the dielectric constant ε1 and the dielectric constant ε2. In the exemplary embodiments, DC bias characteristics of −30% to +30% were deemed to be good.

$$\text{DC bias characteristics (\%)} = 100 \times (\varepsilon 2 - \varepsilon 1)/\varepsilon 1 \quad \text{Formula (1)}$$

The resistivity when a DC bias was applied (DC bias resistivity $\rho_{DC}$) (units Ωcm) were calculated from the insulation resistance when a DC bias of 8 V/μm was applied for 1 minute to a laminated ceramic capacitor sample, the effective surface area of the electrodes, and the distance between electrodes, using a digital ultra-high resistance meter (ADVANTEST; R8340A). A higher value for the DC bias resistivity $\rho_{DC}$ was preferred, and a value of $1.0 \times 10^{12}$ Ωcm or greater was deemed to be good in the present exemplary embodiments.

The high-temperature load lifespan was evaluated using a thermostatic bath and a digital ultra-high resistance meter (ADVANTEST; R8340A), by maintaining a state of DC voltage application under an electric field of 50 V/μm at an ambient temperature of 150° C., and measuring the lifetime. In the present exemplary embodiments, the lifespan was defined as the time from the start of application of the DC voltage until the insulation resistance fell to a single digit. Furthermore, this evaluation was carried out for 10 laminated ceramic capacitor samples and the mean value thereof was taken as the high-temperature load lifespan. A value of 20 hours or greater was deemed to be good in the present exemplary embodiments.

The dielectric constant ε1, the dielectric constant ε2 when a DC bias voltage of 8 V/μm was applied, the DC bias characteristics calculated from ε1 and ε2, the DC bias resistivity $\rho_{DC}$ when a DC bias of 8 V/μm was applied, and the high-temperature load lifespan in the exemplary embodiments and comparative examples are shown in table 1.

It should be noted that O is used to denote cases in which particles are included that have a core-shell structure in which the content of Bi present in the core portion is at least 1.2 times the content of Bi present in the shell portion, and X is used to denote cases in which such particles are not included.

Furthermore, the values in the table for the DC bias resistivity $\rho_{DC}$ column are indexed. For example, $1.0 \times 10^{13}$ Ωcm is denoted as 1.0E+13.

TABLE 1

| | Absence or presence of specific core shell particles | Total proportion of cross-sectional area of core portions (%) | S1:S2 | α (Bi/Sr) | First auxiliary component (molar parts) | | Second auxiliary component (molar parts) | Dielectric constant ε 1 | Dielectric constant ε 2 | 8 V/μm resistivity $\rho_{oc}$ (Ωcm) | High-temperature load lifespan (h) | DC bias characteristics (%) |
|---|---|---|---|---|---|---|---|---|---|---|---|---|
| Exemplary Embodiment 1 | O | 23:77 | 17.5 | 2.833 | none | 0 | 0 | 1916 | 802 | 3.6E+12 | 23 | −58.1 |
| Exemplary Embodiment 2 | O | 20:80 | 15.3 | 2.000 | none | 0 | 0 | 1729 | 1089 | 6.3E+12 | 26 | −37.0 |
| Exemplary Embodiment 3 | O | 19:81 | 15.0 | 2.000 | none | 0 | 0 | 1714 | 1062 | 1.1E+13 | 32 | −38.0 |
| Exemplary Embodiment 4 | O | 1:99 | 0.1 | 0.125 | none | 0 | 0 | 1649 | 1060 | 3.6E+13 | 33 | −35.7 |
| Exemplary Embodiment 5 | O | 27:73 | 17.7 | 2.000 | none | 0 | 0 | 1848 | 1042 | 1.7E+12 | 22 | −43.6 |
| Exemplary Embodiment 6 | O | 24:76 | 16.2 | 2.833 | La | 10 | 0 | 1205 | 958 | 1.8E+12 | 20 | −20.5 |
| Exemplary Embodiment 7 | O | 15:85 | 4.9 | 1.167 | none | 0 | 0 | 2485 | 1318 | 3.7E+13 | 32 | −47.0 |

TABLE 1-continued

| | Absence or presence of specific core shell particles | S1:S2 | Total proportion of cross-sectional area of core portions (%) | α (Bi/Sr) | First auxiliary component (molar parts) | | Second auxiliary component (molar parts) | Dielectric constant ε1 | Dielectric constant ε2 | 8 V/μm resistivity $\rho_{oc}$ (Ωcm) | High-temperature load lifespan (h) | DC bias characteristics (%) |
|---|---|---|---|---|---|---|---|---|---|---|---|---|
| Exemplary Embodiment 8 | ○ | 17:83 | 7.6 | 1.167 | La | 1 | 0 | 2035 | 1455 | 4.1E+13 | 33 | −28.5 |
| Exemplary Embodiment 9 | ○ | 17:83 | 6.8 | 1.167 | La | 15 | 0 | 1907 | 1705 | 2.8E+13 | 34 | −5.9 |
| Exemplary Embodiment 10 | ○ | 14:86 | 3.9 | 0.500 | La | 15 | 0 | 1233 | 1009 | 2.4E+13 | 30 | −18.2 |
| Exemplary Embodiment 11 | ○ | 11:89 | 2.0 | 0.711 | Mg | 5 | 0 | 2374 | 1827 | 3.7E+13 | 34 | −23.0 |
| Exemplary Embodiment 12 | ○ | 4:96 | 1.7 | 0.711 | Zn | 5 | 0 | 2118 | 1748 | 4.2E+13 | 34 | −17.4 |
| Exemplary Embodiment 13 | ○ | 15:85 | 4.6 | 0.625 | Ba | 10 | 0 | 1912 | 1745 | 1.6E+13 | 31 | −8.7 |
| Exemplary Embodiment 14 | ○ | 14.86 | 4.4 | 0.625 | Ca | 10 | 0 | 1880 | 1608 | 3.0E+13 | 33 | −14.5 |
| Exemplary Embodiment 15 | ○ | 16:84 | 6.7 | 2.000 | Gd | 5 | 0 | 1729 | 1552 | 1.2E+13 | 32 | −10.2 |
| Exemplary Embodiment 16 | ○ | 14:86 | 3.7 | 0.500 | La | 15 | 0.1 | 1200 | 1005 | 4.7E+13 | 37 | −16.3 |
| Exemplary Embodiment 17 | ○ | 18:82 | 8.0 | 0.500 | La | 15 | 5.0 | 1160 | 1002 | 5.1E+13 | 42 | −13.6 |
| Exemplary Embodiment 18 | ○ | 16:84 | 5.8 | 2.000 | Nd | 5 | 0 | 1717 | 1541 | 2.5E+13 | 33 | −16.3 |
| Exemplary Embodiment 19 | ○ | 17:83 | 8.4 | 2.000 | Sm | 5 | 0 | 1735 | 1511 | 3.7E+13 | 31 | −12.9 |
| Comparative Example 1 | X | — | — | 2.833 | La | 5 | 0 | 1228 | 922 | 6.8E+11 | 12 | −24.9 |
| Comparative Example 2 | X | — | — | 2.833 | none | 0 | 0 | 1944 | 856 | 6.5E+11 | 14 | −56.0 |
| Comparative Example 3 | X | — | — | 2.000 | none | 0 | 0 | 1809 | 1076 | 6.2E+11 | 11 | −40.2 |

It can be seen from the table above that the dielectric compositions according to Exemplary Embodiments 1-19 including particles having a core-shell structure in which the content of Bi present in the core portion is at least 1.2 times the content of Bi present in the shell portion exhibited a dielectric constant ε2 of 800 or greater, DC bias resistivity of $1.0 \times 10^{12}$ Ωcm or greater, and a high-temperature load lifespan of 20 hours or greater when a DC bias of 8 V/μm was applied.

On the other hand, the dielectric compositions according to Comparative Examples 1-3 which did not include particles having a core-shell structure in which the content of Bi present in the core portion is at least 1.2 times the content of Bi present in the shell portion exhibited DC bias resistivity of less than $1.0 \times 10^{12}$ Ωcm, and a high-temperature load lifespan of less than 20 hours when a DC bias of 8 V/μm was applied.

The dielectric compositions according to Exemplary Embodiments 2-4 and 7-19 in which the mean cross-sectional area of the core portions S1 and the mean cross-sectional area of the shell portions S2 satisfied S1:S2=1:99-20:80 exhibited DC bias resistivity of $5.0 \times 10^{12}$ Ωcm or greater, and a high-temperature load lifespan of 25 hours or greater when a DC bias of 8 V/μm was applied. That is to say, the dielectric compositions according to Exemplary Embodiments 2-4 and 7-19 in which S1:S2 were in the abovementioned range achieved better DC bias resistivity and high-temperature load lifespan than the dielectric compositions according to Exemplary Embodiments 1, 5 and 6 in which S1:S2 were outside the abovementioned range.

The dielectric compositions according to Exemplary Embodiments 3, 4 and 7-19 in which the total area of the core portions constituted 0.1%-15% with respect to the area occupied by the dielectric composition as a whole exhibited a dielectric constant ε2 of 800 or greater, DC bias resistivity of $1.0 \times 10^{13}$ Ωcm or greater, and a high-temperature load lifespan of 30 hours or greater when a DC bias of 8 V/μm was applied, and said dielectric compositions also achieved even better DC bias resistivity and high-temperature load lifespan in comparison with the dielectric compositions according to Exemplary Embodiments 1, 2, 5 and 6 in which the abovementioned area ratio was outside the abovementioned range.

The dielectric compositions according to Exemplary Embodiments 2-5 and 7-19 in which the molar ratio α of Bi with respect to Sr was 0.125≤α≤2.00 exhibited a dielectric constant of 1000 or greater when a DC bias of 8 V/μm was applied, and said dielectric compositions achieved a higher dielectric constant when a DC bias was applied than the dielectric compositions according to Exemplary Embodiments 1 and 6 in which α was outside the abovementioned range.

The dielectric compositions according to Exemplary Embodiments 6 and 8-19 including a first auxiliary component exhibited DC bias characteristics in the range of −30% to +30% when a DC bias of 8 V/μm was applied, and said dielectric compositions achieved better DC bias characteristics in comparison with Exemplary Embodiments 1-5 and 7 which did not include the first auxiliary component.

The dielectric compositions according to Exemplary Embodiments 16 and 17 including a second auxiliary component exhibited a high-temperature load lifespan of 35 hours or greater, and said dielectric compositions achieved a better high-temperature load lifespan in comparison with Exemplary Embodiments 1-15 and 18 which did not include the second auxiliary component.

The invention claimed is:

1. A dielectric composition comprising:
particles having a perovskite crystal structure including at least Bi, Na, Sr and Ti,
wherein at least some of the particles have a core-shell structure comprising a core portion and a shell portion, and
wherein a content of Bi present in the core portion is at least 1.2 times a content of Bi present in the shell portion.

2. The dielectric composition according to claim 1, wherein S1:S2=1:99-20:80 in a cross section of the dielectric composition, and wherein S1 is a mean cross-sectional area of the core portions and S2 is a mean cross-sectional area of the shell portions.

3. The dielectric composition according to claim 1, wherein a total cross-sectional area of the core portions is 0.1%-15% with respect to the dielectric composition as a whole, in a cross section of the dielectric composition.

4. The dielectric composition according to claim 1, wherein $0.125 \leq \alpha \leq 2.00$, where $\alpha$ is a molar ratio of Bi with respect to Sr in the dielectric composition.

5. The dielectric composition according to claim 1, further comprising at least one element selected from the group consisting of La, Ce, Pr, Nd, Sm, Eu, Gd, Tb, Dy, Ho, Yb, Ba, Ca, Mg and Zn.

6. A dielectric element comprising the dielectric composition according to claim 1.

7. An electronic component comprising:
a dielectric layer having the dielectric composition according to claim 1.

8. A laminated electronic component comprising:
a laminated portion formed by alternately laminating an internal electrode layer and a dielectric layer comprising the dielectric composition according to claim 1.

9. A single-layer ceramic capacitor comprising:
a disc-shaped dielectric body comprising the dielectric composition according to claim 1; and
a pair of electrodes, wherein the electrodes are located on both surfaces of the dielectric body.

10. The single-layer ceramic capacitor according to claim 9, wherein a material of the electrodes comprises Cu.

11. A laminated ceramic capacitor comprising:
a capacitor element main body having a structure in which dielectric layers comprising the dielectric composition according to claim 9 and internal electrode layers are alternately stacked; and
a pair of terminal electrodes which are respectively conductively connected with the internal electrode layers alternately arranged inside the main body and which are located at both ends of the main body.

12. The laminated ceramic capacitor according to claim 11, wherein a material of the internal electrode layers comprises Cu.

13. The laminated ceramic capacitor according to claim 11, wherein the internal electrode layers comprise a base metal as a conductive material.

14. The laminated ceramic capacitor according to claim 11, wherein the internal electrode layers comprise Cu alloy as a conductive material.

15. The laminated ceramic capacitor according to claim 11, wherein the terminal electrodes comprise a conductive material having Cu as a main component thereof.

16. A method for producing a laminated ceramic capacitor, the method comprising:
preparing a green chip using a sheet method or a printing method employing a paste for dielectric layers and a paste for internal electrodes, wherein the paste for the dielectric layers is an organic paint comprising a mixture of a dielectric starting material and an organic vehicle or wherein the paste for the dielectric layers is an aqueous paint comprising a mixture of a dielectric starting material and an aqueous vehicle;
performing a debinding treatment;
baking the green chip thereby forming a main body;
printing or transcribing external electrodes on the main body; and
backing the main body,
wherein starting material is selected such that a dielectric composition of the laminated ceramic capacitor comprises particles having a perovskite crystal structure including at least Bi, Na, Sr and Ti,
wherein at least some of the particles have a core-shell structure comprising a core portion and a shell portion, and
wherein a content of Bi present in the core portion is at least 1.2 times a content of Bi present in the shell portion.

17. The method according to claim 16, wherein the paste for the internal electrodes is prepared by mixing a conductive material comprising Au, Pt, Ag, Ag—Pd alloy, Cu or Ni, or various types of oxide which form the conductive material after baking, or organometallic compounds, or resonates with the organic vehicle, and wherein a paste for the external electrodes is prepared in the same way as the paste for the internal electrodes.

* * * * *

UNITED STATES PATENT AND TRADEMARK OFFICE
CERTIFICATE OF CORRECTION

PATENT NO. : 10,490,350 B2  
APPLICATION NO. : 15/745678  
DATED : November 26, 2019  
INVENTOR(S) : Goushi Tauchi Page 1 of 1

It is certified that error appears in the above-identified patent and that said Letters Patent is hereby corrected as shown below:

In the Claims

In Column 17, Line 46, Claim 11, delete "claim 9" and insert --claim 1--.

Signed and Sealed this  
Fourteenth Day of April, 2020

Andrei Iancu  
*Director of the United States Patent and Trademark Office*